United States Patent
Laber

(10) Patent No.: US 6,363,432 B1
(45) Date of Patent: Mar. 26, 2002

(54) MEDIA INDEPENDENT INTERFACE BETWEEN IEEE 802.3 (ETHERNET) BASED PHYSICAL LAYER DEVICES

(75) Inventor: Edgardo Laber, San Jose, CA (US)

(73) Assignee: Micro Linear Corporation, San Jose, CA (US)

( * ) Notice: Subject to any disclaimer, the term of this patent is extended or adjusted under 35 U.S.C. 154(b) by 0 days.

(21) Appl. No.: 09/280,251

(22) Filed: Mar. 29, 1999

(51) Int. Cl.[7] .............................................. G06F 13/00
(52) U.S. Cl. ........................ 709/250; 709/236; 709/238; 370/401; 370/469
(58) Field of Search ................................. 709/230, 232, 709/236, 237, 238, 245, 246, 250; 370/235, 389, 392, 401, 469

(56) References Cited

U.S. PATENT DOCUMENTS

| | | | | |
|---|---|---|---|---|
| 5,668,810 A | * | 9/1997 | Cannella, Jr. | 370/392 |
| 5,673,254 A | * | 9/1997 | Crayford | 370/231 |
| 6,049,528 A | * | 4/2000 | Hendel et al. | 370/235 |
| 6,198,722 B1 | * | 3/2001 | Bunch | 370/229 |
| 6,256,306 B1 | * | 7/2001 | Bellenger | 370/389 |

FOREIGN PATENT DOCUMENTS

| | | | | |
|---|---|---|---|---|
| EP | 0856975 A2 | 8/1998 | ............ | H04L/29/10 |
| WO | WO 98/51044 | 11/1998 | ............ | H04L/12/46 |

OTHER PUBLICATIONS

Johnson H W: "Fast Ethernet. Dawn of a News Network, Passage", US, Upper Saddle River, Prentice Hall PTR, pp. 57–61, 106–114 XP002073888 ISBN: 0–13–352643–7.
"Application Note 44 Designing Fast Ethernet and FDDI–UTP Transceivers," Micro Linear Corporation, Aug. 1995.
"Application Brief 3 ML6673 and Baseline Wander," Micro Linear Corporation, Jul. 1995.
"ML6673 Fast Ethernet/FDDI TP–PMD Transceiver," Micro Linear Corporation, May 1995.
"Application Note 28 Designing a 100MbP/s UTP Transceiver for Local Area Network," Micro Linear Corporation, Mar. 1994.
"DP 83840 10/100 Mb/s Ethernet Physical Layer," National Semiconductor Corporation, Feb. 22, 1995.

* cited by examiner

Primary Examiner—Viet D. Vu
(74) Attorney, Agent, or Firm—Haverstock & Owens LLP

(57) ABSTRACT

A technique for interfacing transmission media in a local area network (LAN). A first transceiver and a second transceiver, each have a media dependent interface and a media independent interface. Each media dependent interface is coupled to respective transmission media while the media independent interfaces are coupled together. A receive clock output of the first transceiver is coupled to a first input of a first multiplexer. A receive clock output of the second transceiver is coupled to a first input of a second multiplexer. A fixed frequency clock signal is coupled to a second input of the first multiplexer and to a second input of the second multiplexer. An output of the first multiplexer is coupled to a reference clock input of the second transceiver. An output of the second multiplexer is coupled to a reference clock input of the first transceiver. A select input of the first multiplexer is coupled to a status output of the first transceiver. A select input of the second multiplexer is coupled to a status output of the second transceiver. The reference clock input for each transceiver is selectively coupled to the fixed-frequency clock signal or to the receive clock signal generated by the other transceiver according to whether data is being received from the other transceiver. Accordingly, data is passed from one transceiver to the other without intermediate buffering. Therefore, the invention reduces complexity associated with prior techniques for interfacing transmission media. Preferably, the invention is practiced in a Fast Ethernet LAN.

33 Claims, 6 Drawing Sheets

MEDIA INDEPENDENT INTERFACE BETWEEN IEEE 802.3 (ETHERNET) BASED PHYSICAL LAYER DEVICES

FIELD OF THE INVENTION

The present invention relates to the field of local area networks. More particularly, the present invention relates to a technique for interfacing disparate transmission media in an IEEE 802.3 (Ethernet) local area network.

BACKGROUND OF THE INVENTION

The IEEE 802.3 standard for local area networks is often referred to as Ethernet. This standard allows network devices of various manufacturers, such as network interface cards (NICs), hubs, bridges, routers, and switches, to communicate packetized data with each other in a local area network (LAN). The IEEE 802.3 standard is defined in terms of the Open Systems Interconnection (OSI) reference model. This model defines a data communication system in terms of layers. Among the layers included in the OSI model are: (1) the physical layer (PHY), which specifies the electrical and coding characteristics of the transmission medium; (2) the medium access control (MAC) layer, which controls flow of data through the network; and (3) the network layer, which sets up connections between sources and destinations for data communicated in the network. Other layers include the transport layer, which is a protocol stack for transporting the data, and the application layer, such as a word-processor or spread sheet application.

A supplement to the 802.3 standard, for higher data transmission rates, is the 802.3u standard which often referred to as Fast Ethernet. This standard includes several physical layer (PHY) specifications, including 100BASE-TX (for Category 5 data grade unshielded twisted pair (UTP) cabling), 100BASE-FX (for fiber-optic cabling) and 100BASE-T4 (for Category 3 voice grade UTP). Each of these PHY specifications has its own advantages and disadvantages. For example, 100BASE-TX requires fewer UTP cables between network nodes than does 100BASE-T4, however, Category 5 UTP cabling is required for 100BASE-TX. Therefore, 100BASE-T4 may be more appropriate for a site which has existing Category 3 UTP cables in place for a telephone system. Further, the fiber-optic cables used for 100BASE-FX tend to be more costly than UTP cables, especially if UTP cables are already in place, however, fiber-optic cables allow for greater distances between network nodes. For example, 100BASE-TX or 100BASE-T4 can be an appropriate choice for LAN segments within a building, while 100BASE-FX can be an appropriate choice for connections between buildings. In addition, because fiber-optic cabling exhibits greater immunity to electrical noise than copper conductors, 100BASE-FX can be appropriate choice for electrically noisy environments. Therefore, it can be desirable for a single LAN to encompass more than one type of transmission media.

The 802.3u standard also includes a specification for a Medium-Independent Interface (MII) between the physical layer (PHY) and the medium access control (MAC) layer. Thus, a bridge for a Fast Ethernet network can include different transceivers for the different PHY layers, each of which communicates with a MAC layer of the bridge according to the MII specification. Fast Ethernet includes capability for simultaneous communication in two directions (full-duplex). Data is generally communicated serially over the transmission media in an Ethernet LAN, whereas, the MII specification requires parallel data communication. Therefore, a Fast-Ethernet transceiver typically performs serial-to-parallel conversion.

An example of a Fast Ethernet bridge 100 is illustrated in FIG. 1. A first 100BASE-TX transceiver 102 is coupled to a Category 5 UTP network segment 104. The transceiver 102 is coupled to a control/buffer block 106 via an interface 108. Similarly, a second 100BASE-TX transceiver 110 is coupled to a Category 5 UTP network segment 112. The transceiver 110 is coupled to the control/buffer block 106 via an interface 114. A 100BASE-FX transceiver 116 is coupled to a fiber-optic network segment 118. The transceiver 116 is coupled to the control/buffer block 106 via an interface 120. Each of interfaces 108, 114, 120 is in accordance with the MII standard. The bridge 100 receives data from the segments 104, 112, 118, filters, stores and forwards the data to the segments 104, 112, 118, as appropriate. To perform these functions, the control/buffer block 106 requires data processing and buffering capability.

Accordingly, the Fast Ethernet bridge 100 interconnects disparate transmission media. Due to its complexity, however, such a Fast Ethernet bridge 100 is relatively costly. Further, because the Fast Ethernet bridge buffers the data, transmission delays are introduced. Therefore, what is needed is an economical technique for interconnecting disparate transmission media in a Fast Ethernet LAN. What is further needed is a technique for interconnecting disparate transmission media in a Fast Ethernet LAN that minimizes transmission delays.

SUMMARY OF THE INVENTION

The invention is a technique for interfacing transmission media in a local area network (LAN). According to the present invention, physical layer devices, such as a first transceiver and a second transceiver, each have a media dependent interface and a media independent interface. The media dependent interface of each transceiver is coupled to respective transmission media while the media independent interface of each transceiver is coupled to the media independent interface of the other transceiver. Data received from the respective transmission media by one of the transceivers is passed directly to the media independent interface of the other transceiver without first being modified or buffered. This contrasts with prior techniques which require intermediate data processing and buffering between transceivers.

Each transceiver includes a reference clock input terminal and a receive clock output terminal. The reference clock input terminal is coupled to receive a reference clock signal which is utilized for clocking data into the transceiver from the media independent interface, for clocking data out from the transceiver to the media dependent interface, and which is utilized as a reference for a receive phase-locked loop (PLL). The receive PLL of each transceiver is locked to a data signal received from the transmission media via the media dependent interface and provides a phase-aligned clock signal to the receive clock output. For purposes of this document, a data signal can be either an idle signal or a content-containing signal. The phase-aligned clock signal is aligned in phase to the data signal received from the media dependent interface. When the transmission media is initially quiet, a delay period of time is required after the data signal is received from the media dependent interface for the phase-aligned clock signal to become aligned with it. In addition, each transceiver includes a status output terminal which provides a status signal. The status signal is active when the data signal is being received from the transmission media by the transceiver.

The receive clock output terminal of the first transceiver is coupled to a first input terminal of a first multiplexer logic. The receive clock output terminal of the second transceiver is coupled to a first input terminal of a second multiplexer logic. A fixed frequency clock signal is coupled to a second input terminal of the first multiplexer logic and to a second input terminal of the second multiplexer logic. An output terminal of the first multiplexer logic is coupled to the reference clock input terminal of the second transceiver, while an output terminal of the second multiplexer logic is coupled to the reference clock input terminal of the first transceiver. A select input terminal of the first multiplexer logic is coupled to the status output terminal of the first transceiver, while a select input of the second multiplexer logic is coupled to the status output terminal of the second transceiver. Preferably, a delay block having a delay equal to the delay required for the corresponding phase-aligned clock signal to become aligned with the data signal being received is coupled between each respective status output terminal and the corresponding select input terminal.

The reference clock input terminal for each transceiver is selectively coupled to the fixed-frequency clock signal or to the phase-aligned clock signal generated by the other transceiver according to whether data is being received from the other transceiver via the media independent interface. Thus, when data is being passed from one transceiver to the other via the media independent interface, the phase-aligned clock signal generated by the transceiver providing the data is coupled to the reference clock input signal of the other transceiver. At other times, the fixed frequency clock signal is coupled to the reference clock input terminal.

Accordingly, the invention provides a novel modification to the media independent interface and utilizes the media independent interface for each transceiver in a novel manner such that data is passed from one transceiver to the other without the need for intermediate first-in, first-out (FIFO) buffering. The invention reduces complexity associated with prior techniques for interfacing transmission media. In the preferred embodiment, the present invention is practiced in a Fast Ethernet LAN (in accordance with the IEEE 802.3u standard).

DETAILED DESCRIPTION OF A PREFERRED EMBODIMENT

Figure 1:
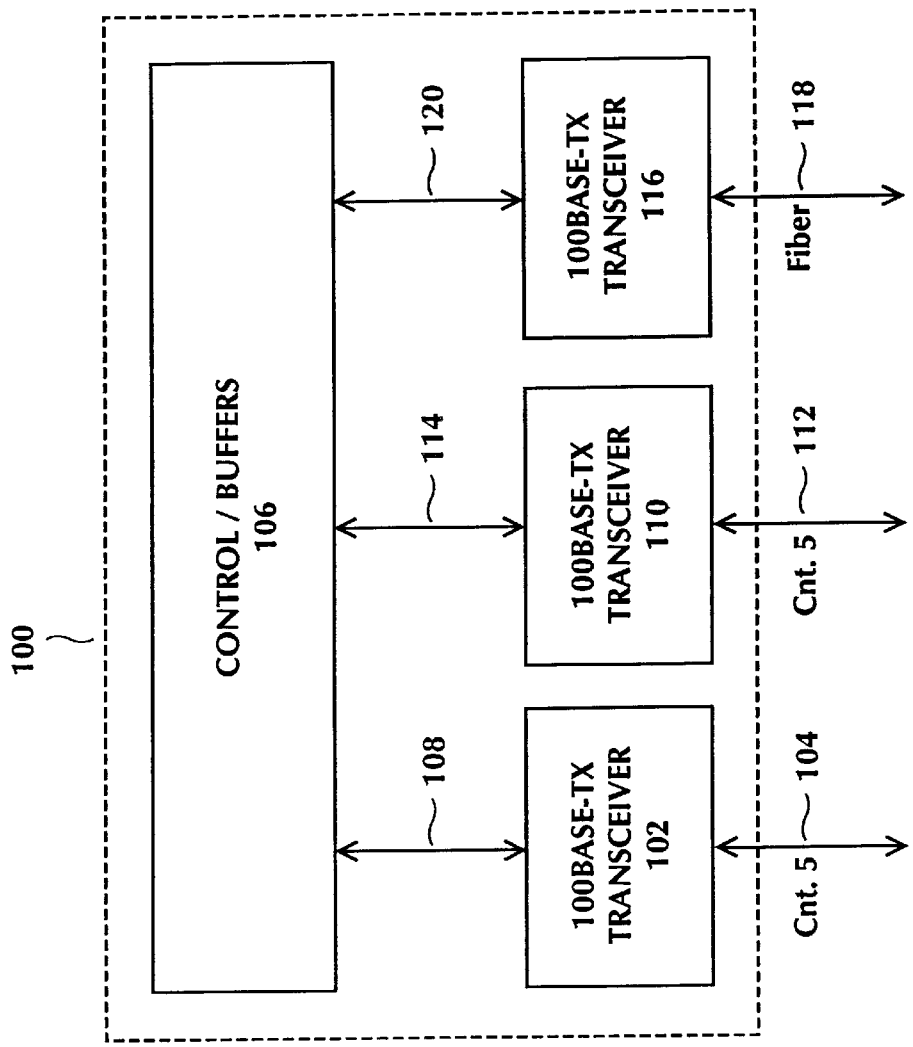
FIG. 1 illustrates a Fast Ethernet bridge of the prior art.
Figure 2:
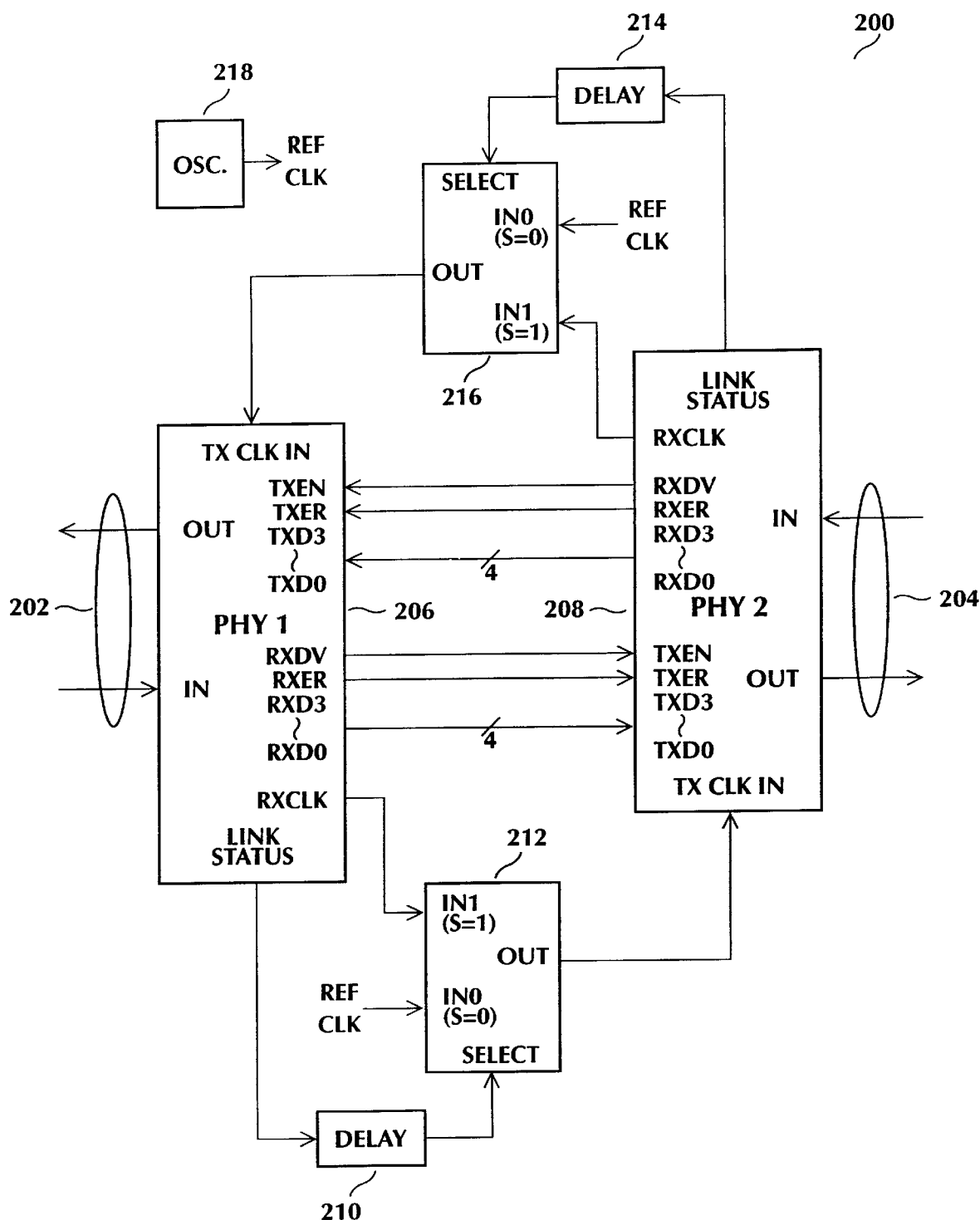
FIG. 2 illustrates a circuit according to the present invention for interfacing transmission media in a local area network.

FIG. 2 illustrates a circuit 200 according to the present invention for interfacing transmission media 202, 204 in a local area network. A first transmission media 202 is coupled to a first physical layer (PHY) device 206. A second transmission media 204 is coupled to a second physical layer device 208. Each of the first transmission media 202, 204 can be the same type of transmission media as the other or a different type of transmission media. Examples of types of transmission media are Category 3 unshielded twisted pair (UTP), Category 5 UTP and fiber-optic transmission media, though it will be apparent that other types of transmission media can be utilized. Each physical layer device 206, 208 functions as a transceiver relative the respective transmission media 202, 204.

Each of the physical layer devices 206, 208 is preferably configured according to the type of corresponding transmission media 202 or 204. Thus, each physical layer device 206, 208 includes an interface to the corresponding transmission media which is dependent upon the type of transmission media (a media dependent interface). For example, assume that the transmission media 202 is a pair of Category 5 UTP cables. Then, the physical layer device 206 can be a 100BASE-TX transceiver, such as part number ML6697 from Micro Linear Corporation, located at 2092 Concourse Drive, San Jose, Calif. And, for example, assuming the transmission media 204 is a fiber-optic cable, then the physical layer device 208 can be a 100BASE-FX transceiver. It will be apparent, however, that the physical layer devices 206, 208 can include a media dependent interface (MDI) which is configured for a different transmission media and that each of the physical layer devices 206, 208 can be from any manufacturer. Because the present invention can be implemented such that both transmission media 202, 204 are of the same type, the circuit illustrated in FIG. 2 can be implemented with each physical layer device 206, 208 being an ML6697 integrated circuit, depending upon the circumstances. In the preferred embodiment, each physical layer device 206, 208 includes an MDI which functions according to a standard promulgated by the Institute of Electrical and Electronics Engineers (the IEEE) under the designation 802.3 (Ethernet).

The physical layer devices 206, 208 each includes a media independent interface (MII). In the preferred embodiment, the MII interface implemented by each physical layer device 206, 208 is also designed in accordance with a standard promulgated by the IEEE under the designation 802.3. Certain features of the interface between the physical layer devices 206, 208, however, are not specified by the IEEE 802.3 standard and are believed to constitute advances over the prior art. These differences allow data to be passed between the physical layer devices 206, 208 without intermediate buffering. In particular, a feature of the present invention which is believed to constitute an improvement over the prior art is that a MII interface of each physical layer device 206, 208 is coupled to the MII interface of the other. This is in contrast to the IEEE 802.3 standard which contemplates that each MII interface is coupled to a media access control device (MAC), which acts as an intermediary to each MII interface and which includes data buffering capability.

Thus, according to the present invention, a TX EN terminal of the physical layer device 206 is coupled to an RX DV terminal of the physical layer device 208. A TX ER terminal of the physical layer device 206 is coupled to an RX ER terminal of the physical layer device 208. A TXD0 terminal of the physical layer device 206 is coupled to a RXD0 terminal of the physical layer device 208. A TXD1 terminal of the physical layer device 206 is coupled to a RXD1 terminal of the physical layer device 208. A TXD2 terminal of the physical layer device 206 is coupled to a RXD2 terminal of the physical layer device 208. A TXD3 terminal of the physical layer device 206 is coupled to a RXD3 terminal of the physical layer device 208.

In addition, a TX EN terminal of the physical layer device 208 is coupled to an RX DV terminal of the physical layer device 206. A TX ER terminal of the physical layer device 208 is coupled to an RX ER terminal of the physical layer device 206. A TXD0 terminal of the physical layer device 208 is coupled to a RXD0 terminal of the physical layer device 206. A TXD1 terminal of the physical layer device 208 is coupled to a RXD1 terminal of the physical layer device 206. A TXD2 terminal of the physical layer device 208 is coupled to a RXD2 terminal of the physical layer device 206. A TXD3 terminal of the physical layer device 208 is coupled to a RXD3 terminal of the physical layer device 206.

A LINK STATUS output of the physical layer device 206 is coupled to an input terminal of a delay block 210. An output of the delay block 210 is coupled to a select input of a multiplexer 212. An RXCLK output of the physical layer device 206 is coupled to a first input terminal IN1 of the multiplexer 212. A fixed frequency clock signal REF CLK is coupled to a second input terminal IN0 of the multiplexer 212. An output of the multiplexer 212 is coupled to a TX CLK IN terminal of the physical layer device 208.

A LINK STATUS output of the physical layer device 208 is coupled to an input terminal of a delay block 214. An output of the delay block 214 is coupled to a select input of a multiplexer 216. An RXCLK output of the physical layer device 208 is coupled to a first input terminal IN1 of the multiplexer 216. A fixed frequency clock signal REF CLK is coupled to a second input terminal IN0 of the multiplexer 216. An output of the multiplexer 216 is coupled to a TX CLK IN terminal of the physical layer device 206.

In the preferred embodiment, the fixed frequency clock signal REF CLK coupled to each of the multiplexers 212, 214 is generated by the same oscillator 218, however, it will be apparent that the clock signal coupled each multiplexer 212, 214 can be generated by a different oscillator. Also in the preferred embodiment, the frequency of REF CLK is 25 MHz, although it will be apparent that in certain systems, another frequency could be utilized.

Preferably, the transmission media 202, 204 are each capable of communication in two directions (full-duplex). When both transmission media 202, 204 are quiet such that no idle or stream signal is being transmitted in either direction, each of the multiplexers 212, 214 is conditioned to pass the fixed frequency clock signal REF CLK to its respective output. This fixed frequency clock signal REF CLK is, therefore, provided to the TX CLK IN terminal of each physical layer device 206, 208 for controlling the functioning of the respective physical layer device 206, 208.

When a data signal, such as an idle or stream signal, begins to be received by the physical layer device 206, the LINK STATUS output of the physical layer device 206 becomes active. This LINK STATUS output indicates that data signal recognized as valid is being received by the physical layer device 206. The LINK STATUS output activates the delay block 210.

Each physical layer device 206, 208 includes clock recovery circuits having a phase-locked loop (PLL). The clock signal provided at the TX CLK IN terminal of each physical layer device 206, 208 is used a reference by the respective clock recovery circuits for recovery of a clock signal (referred to herein as "a phase-aligned clock signal") from the incoming data signal. The PLL generates the phase-aligned clock signal at the RX CLK terminal of the physical layer device 206. This phase-aligned clock signal is derived from the incoming data signal. Thus, any transmission delays or time variances are reflected in this phase-aligned clock signal.

A finite amount of time is generally required for the PLL within the physical layer device 206 to become aligned in phase with the incoming data signal. Accordingly, the delay block 210 is conditioned for a delay which is approximately equal to an amount of time expected to elapse between activation of the LINK STATUS signal and alignment of the PLL to the incoming data signal. Therefore, at the expiration of the delay time, the phase-aligned clock signal appearing at the RX CLK terminal of the physical layer device 206 is expected to be aligned in phase with the incoming data signal from the transmission media 202. In addition, at the expiration of this delay time, the output of the delay block 210 conditions the multiplexer 212 to provide the phase-aligned clock signal to the TX CLK IN terminal of the physical layer device 208.

The data received from the transmission media 202 by the physical layer device 206 is in a form appropriate for the transmission media 202, which is generally serial format, whereas the MII standard specifies a four-bit wide parallel format at the terminals RXD (3:0) of the physical layer device 206. Therefore, internally to the physical layer device 206, the incoming data is appropriately converted into the four-bit wide parallel format. Then, the data is passed directly to the TXD (3:0) terminals of the media independent interface of the physical layer device 208 without first being modified or buffered. The physical layer device 208 then converts the data from parallel to serial, or to a form appropriate for the transmission media 204, utilizing the phase-aligned clock signal provided to the TX CLK IN terminal of the physical layer device 208 for sampling the data. The data is then provided to the transmission media 204 by the physical layer device 208.

Once the data signal is no longer being received from the transmission media 202 by the physical layer device 206, the LINK STATUS output of the physical layer device 206 reconfigures the multiplexer 212 to provide the REF CLK signal to the TX CLK IN terminal of the physical layer device 208.

Conversely, when a data signal, such as an idle or stream signal, begins to be received by the physical layer device 208, the LINK STATUS output of the physical layer device 208 becomes active. This LINK STATUS output indicates that data signal recognized as valid is being received by the physical layer device 208. The LINK STATUS activates the delay block 214.

A PLL within the physical layer device 208 generates a phase-aligned clock signal at RX CLK terminal of the physical layer device 208 which is derived from the incoming data signal from the transmission media 204. Thus, any transmission delays are reflected in this phase-aligned clock signal.

A finite amount of time is generally required for a phase-locked loop (PLL) to become aligned in phase with the incoming data signal. Accordingly, the delay block 214 is conditioned for a delay which is approximately equal to an amount of time expected to elapse between activation of the LINK STATUS signal and alignment of the PLL to the incoming data signal. Therefore, at the expiration of the delay time, the phase-aligned clock signal appearing at the RX CLK terminal of the physical layer device 208 is expected to be aligned in phase with the incoming signal. In addition, at the expiration of this delay time, the output of the delay block 214 conditions the multiplexer 216 to provide the phase-aligned clock signal to the TX CLK IN terminal of the physical layer device 206.

The data received from the transmission media 204 by the physical layer device 208 is in a form appropriate for the transmission media 204, which is generally serial format, whereas the MII standard specifies a four-bit wide parallel format at the terminals RXD (3:0) of the physical layer device 208. Therefore, internally to the physical layer device 208, the incoming data is appropriately converted into the four-bit wide parallel format. Then, the data is passed directly to the TXD (3:0) terminals of the media independent interface of the physical layer device 206 without first being modified or buffered. The physical layer device 206 then converts the data from parallel to serial, or to a form appropriate for the transmission media 202, utilizing the phase-aligned clock signal provided to the TX CLK IN terminal of the physical layer device 206 for sampling the data. The data is then provided to the transmission media 202 by the physical layer device 206.

Once the data signal is no longer being received from the transmission media 204 by the physical layer device 208, the LINK STATUS output of the physical layer device 208 reconfigures the multiplexer 214 to provide the REF CLK signal to the TX CLK IN terminal of the physical layer device 206.

When data signals are simultaneously being communicated in both directions, a phase-aligned clock signal formed by each of the physical layer devices 206, 208 is utilized by the other as a reference for the respective PLL and for converting the data from parallel into a format appropriate for the respective transmission media 206, 208.

Figure 3A:
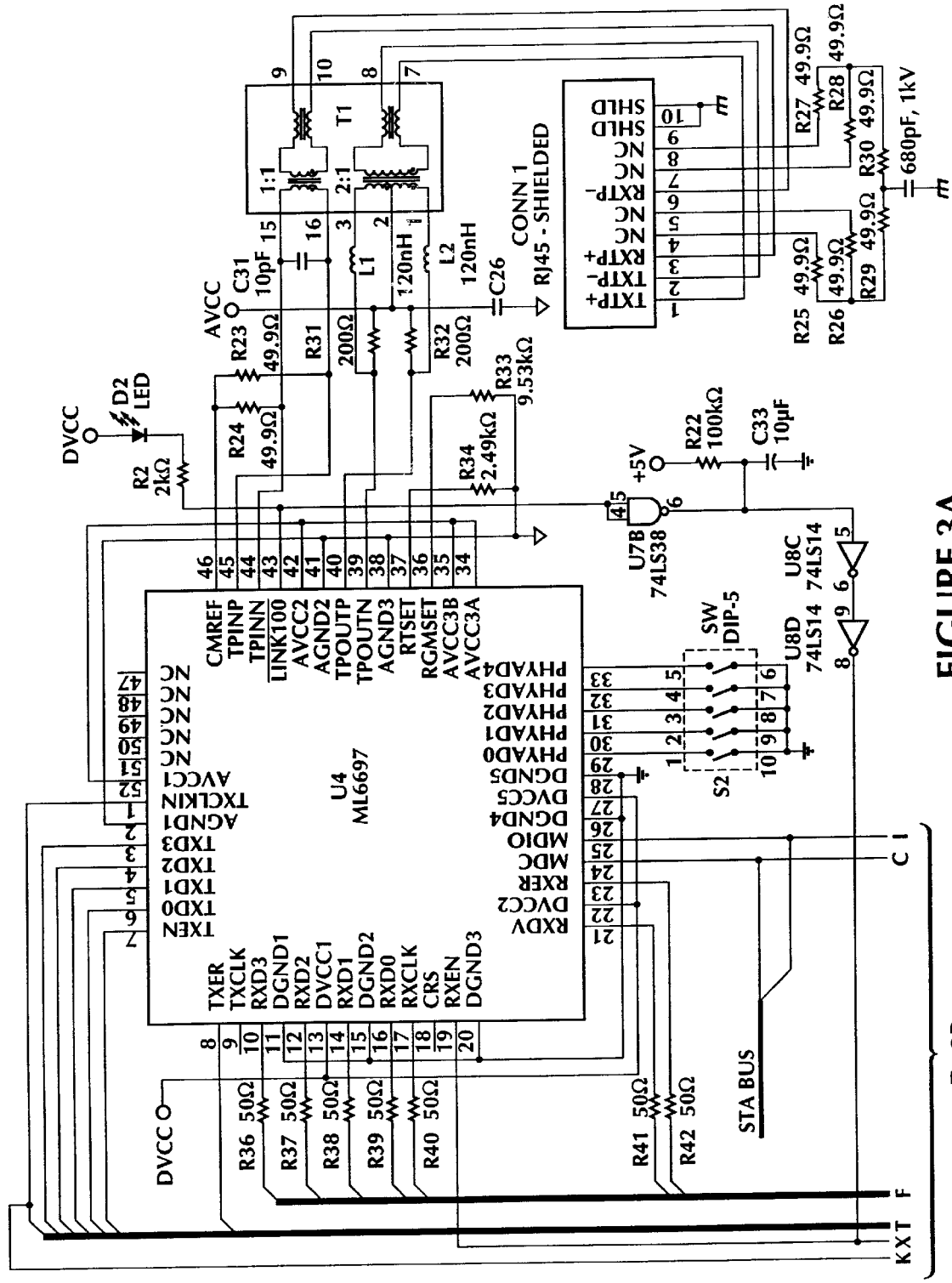
FIG. 3A and 3B illustrate a detailed schematic diagram of a circuit in accordance with the present invention.
Figure 3B:
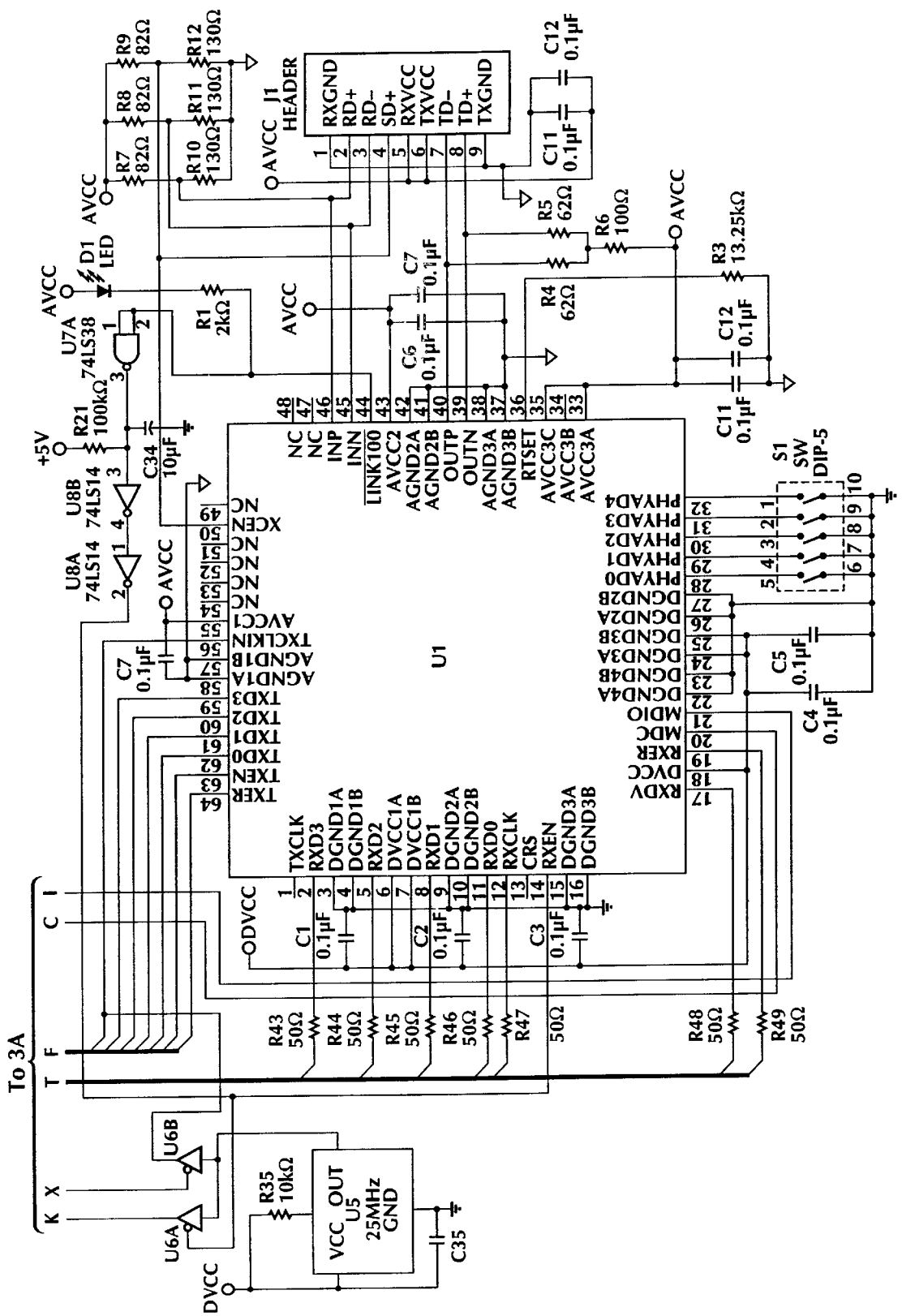

FIG. 3 illustrates a detailed schematic diagram of a circuit in accordance with the present invention. The circuit illustrated in FIG. 3 is a more detailed example of the circuit illustrated in FIG. 2 where the physical layer device 206 is replaced with an integrated circuit U4 and the physical layer device 208 is replaced with an integrated circuit U1. The multiplexer logic 212 illustrated in FIG. 2 is implemented as buffer U6B, resistor R40 and a buffer within U4 in FIG. 3. Further, the multiplexer logic 216 illustrated in FIG. 2 is implemented as buffer U6A, resistor R47 and a buffer within U1 in FIG. 3. In addition, delay block 214 illustrated in FIG. 2 is implemented as NAND gate U7A and inverters U8A and U8B in FIG. 3, while delay block 210 illustrated in FIG. 2 is implemented as NAND gate U7B and inverters U8C and U8D in FIG. 3.

In the preferred embodiment, the integrated circuits U1 and U4, are preconditioned for certain timing considerations. In particular, assuming a nominal clock rate of 25 MHz, then each clock period is 40 ns. The MII standard requires that data is valid for approximately 20 ns each clock period, whereas the integrated circuits U1 and U4 preferably provide valid data for approximately 35 ns each clock period. The ML6697 integrated circuit exhibits this preferred characteristic. It will be apparent, however, that the integrated circuits U1 and U4 can be from any manufacturer.

Figure 4:
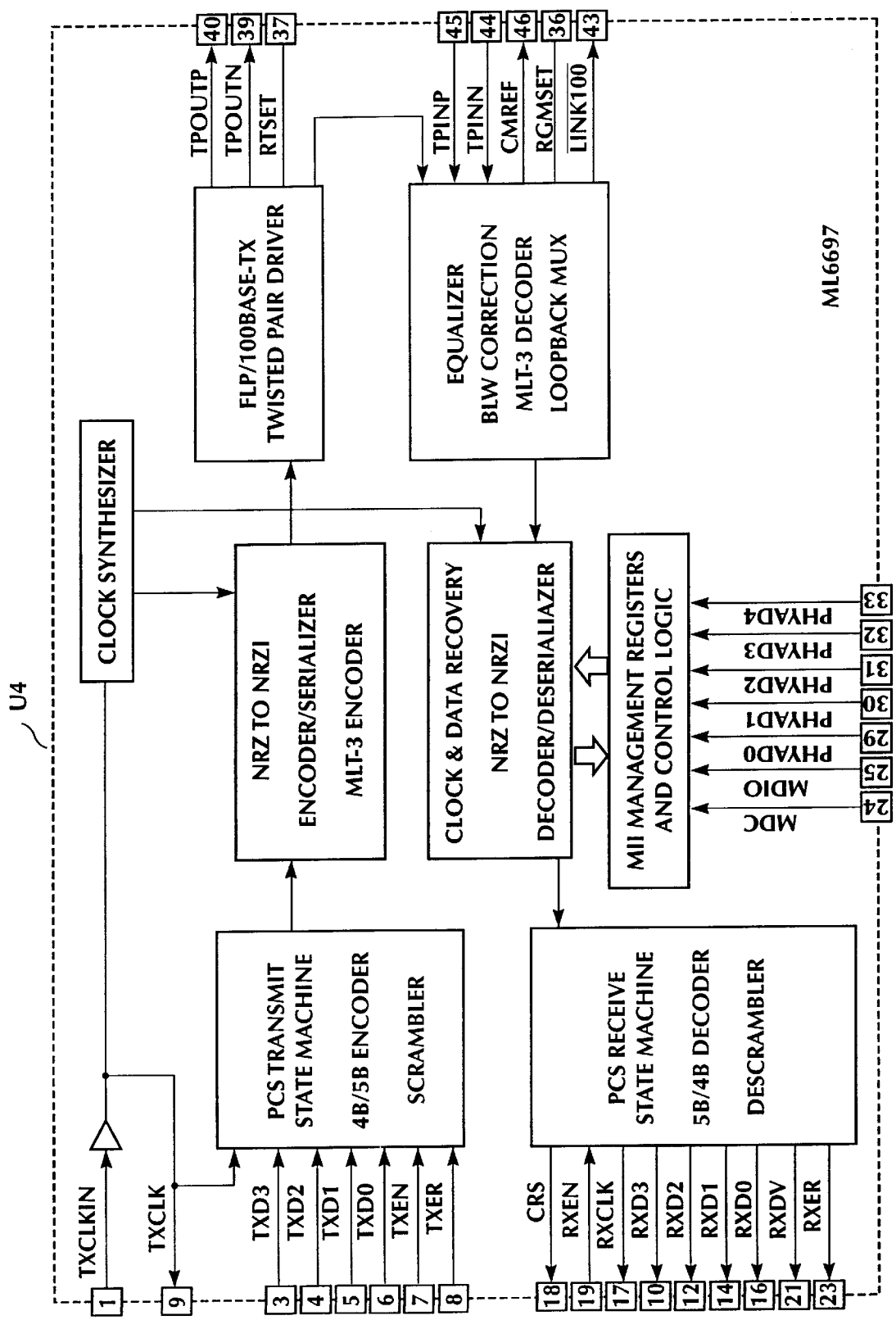
FIG. 4 illustrates a block schematic diagram of a 100BASE-TX physical layer device.
Figure 5:
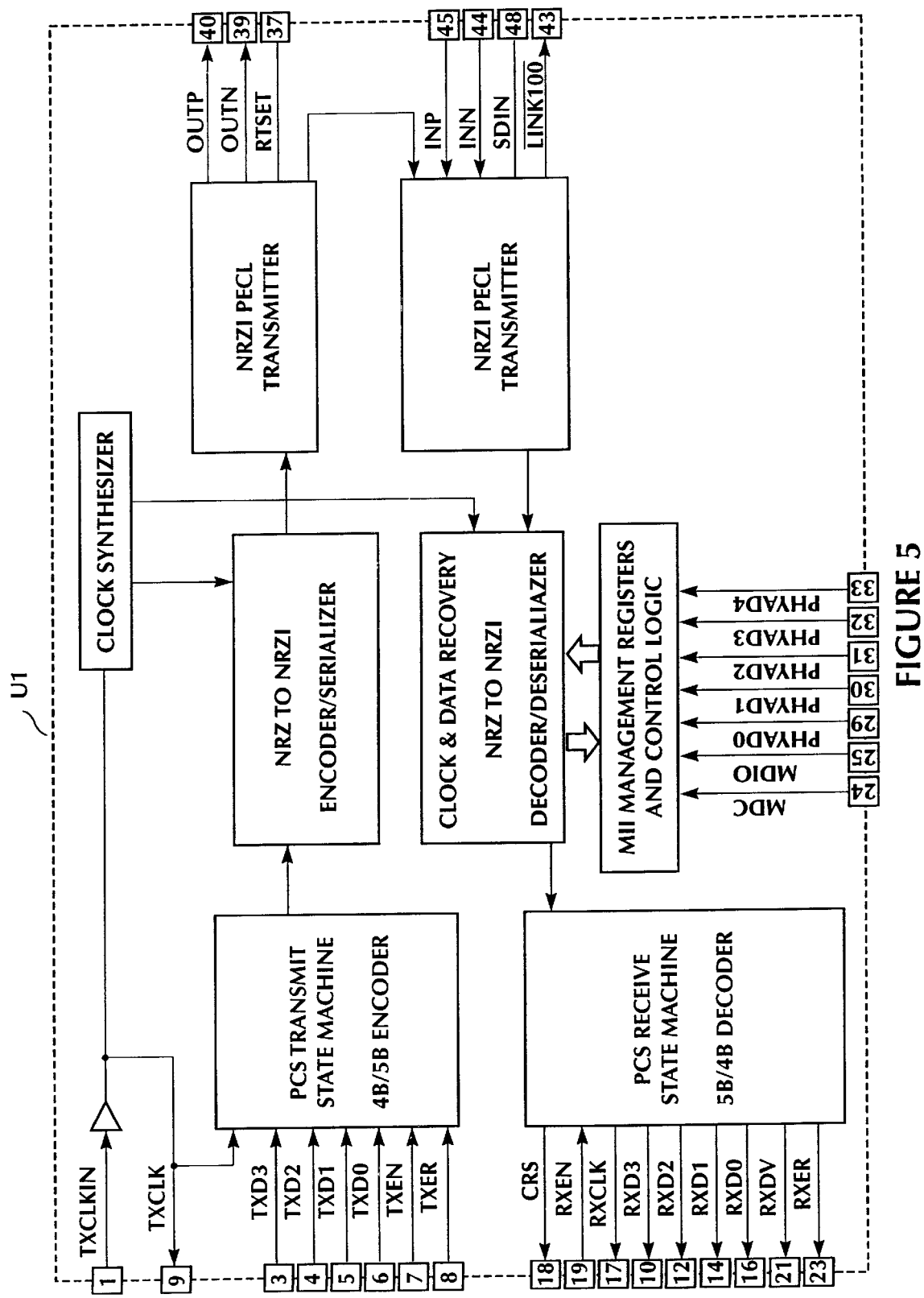
FIG. 5 illustrates a block schematic diagram of a 100BASE-FX physical layer device.

FIG. 4 illustrates a block schematic diagram of the ML6697 100BASE-TX physical layer device. FIG. 5 illustrates a block schematic diagram of a 100BASE-FX physical layer device.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components, current levels, and voltage levels disclosed herein.

What is claimed is:

1. A method of interfacing transmission media, the method comprising steps of:
   a. providing a first physical layer device for receiving a data signal from a first transmission media and for deriving a clock signal from the data signal;
   b. providing a second physical layer device for receiving the data signal from the first physical layer device and for transmitting the data signal to a second transmission media;
   c. passing the data signal from the first physical layer device to the second physical layer device without buffering the data signal between the first and second physical layer devices; and
   d. providing the derived clock signal to the second physical layer device.

2. The method according to claim 1 wherein the first physical layer device performs serial to parallel conversion on the data signal and wherein the second physical layer device performs parallel to serial conversion on the data signal.

3. The method according to claim 1 wherein the first physical layer device and the second physical layer device each includes a media independent interface (MII) which is designed to operate in accordance with a standard promulgated by the Institute of Electrical and Electronics Engineers (IEEE) and designated 802.3.

4. The method according to claim 3 wherein the step of passing the data signal from the first physical layer device to the second physical layer device is performed via the MII interface of each of the first and second physical layer devices.

5. The method according to claim 3 wherein the first physical layer device and the second physical layer device are each implemented as an integrated circuit.

6. The method according to claim 1 wherein the first transmission media and the second transmission media are each a type selected from a group consisting of fiber-optic cables and twisted pair cables, and wherein the first transmission media is not the same type as the second transmission media.

7. The method according to claim 1 wherein the first transmission media and the second transmission media are each a type selected from a group consisting of fiber-optic cables and twisted pair cables, and wherein the first transmission media is the same type as the second transmission media.

8. The method according to claim 1 wherein the step of providing the derived clock signal to the second physical layer device is performed only when the first physical layer device is actively receiving the data signal from the first transmission media and further comprising a step of providing a fixed frequency clock signal to the second physical layer device at other times.

9. The method according to claim 8 wherein the first physical layer device and the second physical layer device each includes a media independent interface (MII) which is designed to operate in accordance with a standard promulgated by the Institute of Electrical and Electronics Engineers (IEEE) and designated 802.3.

10. The method according to claim 9 wherein the step of passing the data signal from the first physical layer device to the second physical layer device is performed via the MII interface of each of the first and second physical layer devices.

11. The method according to claim 8 further comprising a step of providing a multiplexer logic for selecting between providing the clock signal to the second physical layer device and providing the fixed frequency clock signal to the second physical layer device.

12. The method according to claim 11 wherein the first physical layer device generates a status output signal indicative of whether the first physical layer device is actively receiving the data signal from the first transmission media and further comprising a step of providing the status output signal to a select input of the multiplexer logic.

13. The method according to claim 12 further comprising a step of providing a delay between a change in the status output signal and indicating the change in the status output signal to the first multiplexer logic circuit.

14. A circuit for interfacing transmission media, the circuit comprising:
   a. a first physical layer device for receiving a data signal from a first transmission media and for deriving a clock signal from the data signal; and
   b. a second physical layer device for receiving the data signal from the first physical layer device such that the data signal is not buffered between the first and second physical layer devices and the second physical layer device for transmitting the data signal to a second transmission media wherein the second physical layer device receives the derived clock signal from the first physical layer device when the first physical layer device is actively receiving the data signal from the first transmission media and wherein the second physical layer device receives a fixed frequency clock signal at other times.

15. The circuit according to claim 14 wherein the first physical layer device performs serial to parallel conversion on the data signal and wherein the second physical layer device performs parallel to serial conversion on the data signal.

16. The circuit according to claim 14 wherein the first physical layer device and the second physical layer device each includes a media independent interface (MII) which is designed to operate in accordance with a standard promulgated by the Institute of Electrical and Electronics Engineers (IEEE) and designated 802.3.

17. The circuit according to claim 14 wherein the first transmission media and the second transmission media are each a type selected from a group consisting of fiber-optic cables and twisted pair cables, and wherein the first transmission media is not the same type as the second transmission media.

18. The circuit according to claim 14 wherein the first transmission media and the second transmission media are each a type selected from a group consisting of fiber-optic cables and twisted pair cables, and wherein the first transmission media is the same type as the second transmission media.

19. The circuit according to claim 14 further comprising a multiplexer logic coupled to the second physical layer device, the multiplexer logic for selecting between providing the clock signal to the second physical layer device and providing the fixed frequency clock signal to the second physical layer device.

20. The circuit according to claim 19 wherein the first physical layer device and the second physical layer device each includes a media independent interface (MII) which is designed to operate in accordance with a standard promulgated by the Institute of Electrical and Electronics Engineers (IEEE) and designated 802.3.

21. The circuit according to claim 19 wherein the first physical layer device generates a status output signal indicative of whether the first physical layer device is actively receiving the data signal from the first transmission media and wherein the status output signal is coupled to a select input of the multiplexer logic.

22. The circuit according to claim 21 further comprising a delay block coupled for providing a delay between a change in the status output signal and indicating the change in the status output signal to the first multiplexer logic circuit.

23. A circuit for interfacing transmission media, the circuit comprising:
   a. a first physical layer device for receiving a data signal from a first transmission media and for deriving a clock signal from the data signal wherein the first physical layer device includes a media independent interface (MII) which is designed to operate in accordance with a standard promulgated by the Institute of Electrical and Electronics Engineers (IEEE) and designated 802.3; and
   b. a second physical layer device for receiving the data via the MII without buffering the data signal between the first and second physical layer devices and the second physical layer device for transmitting the data signal to a second transmission media wherein the second physical layer device receives the derived clock signal from the first physical layer device.

24. The circuit according to claim 23 wherein the first transmission media and the second transmission media are each a type selected from a group consisting of fiber-optic cables and twisted pair cables, and wherein the first transmission media is not the same type as the second transmission media.

25. The circuit according to claim 23 wherein the first transmission media and the second transmission media are each a type selected from a group consisting of fiber-optic cables and twisted pair cables, and wherein the first transmission media is the same type as the second transmission media.

26. The circuit according to claim 23 further comprising a multiplexer logic coupled to the second physical layer device, the multiplexer logic for selecting between providing the clock signal to the second physical layer device and providing the fixed frequency clock signal to the second physical layer device.

27. The circuit according to claim 26 wherein the first physical layer device generates a status output signal indicative of whether the first physical layer device is actively receiving the data signal from the first transmission media and wherein the status output signal is coupled to a select input of the multiplexer logic.

28. The circuit according to claim 27 further comprising a delay block coupled for providing a delay between a change in the status output signal and indicating the change in the status output signal to the first multiplexer logic circuit.

29. A circuit for interfacing a first transmission media to a second transmission media, the circuit comprising:
   a. a first transceiver for communicating with the first transmission media wherein the first transceiver includes a first clock input terminal and a first clock output terminal wherein a first derived clock signal generated at the first clock output terminal is derived from a first data signal received from the first transmission media by the first transceiver;

b. a second transceiver for communicating with the second transmission media and coupled to the first transceiver for communicating with the first transceiver wherein the second transceiver includes a second clock input terminal and a second clock output terminal wherein a second clock signal generated at the second clock output terminal is derived from a data signal received from the second transmission media by the second transceiver;

c. a first selecting circuit for selecting between coupling a first reference clock signal or the second clock signal to the first clock input terminal according to whether the data signal is being received from the second transmission media; and d. a second selecting circuit for selecting between coupling a second reference clock signal or the second clock signal.

30. The circuit according to claim 29 wherein the first transmission media and the second transmission media are each a type selected from a group consisting of fiber-optic cables and twisted pair cables, and wherein the first transmission media is not the same type as the second transmission media.

31. The circuit according to claim 29 wherein the first transceiver communicates with the first transmission media according to a 100BASE-FX standard.

32. The circuit according to claim 31 wherein the second transceiver communicates with the second transmission media according to a 100BASE-TX standard.

33. The circuit according to claim 29 wherein the first transmission media and the second transmission media are each a type selected from a group consisting of fiber-optic cables and twisted pair cables, and wherein the first transmission media is the same type as the second transmission media.

* * * * *